May 21, 1929.  E. F. WESTON  1,714,202
ELECTRICAL INDICATING INSTRUMENT
Filed Sept. 6, 1927  2 Sheets-Sheet 1
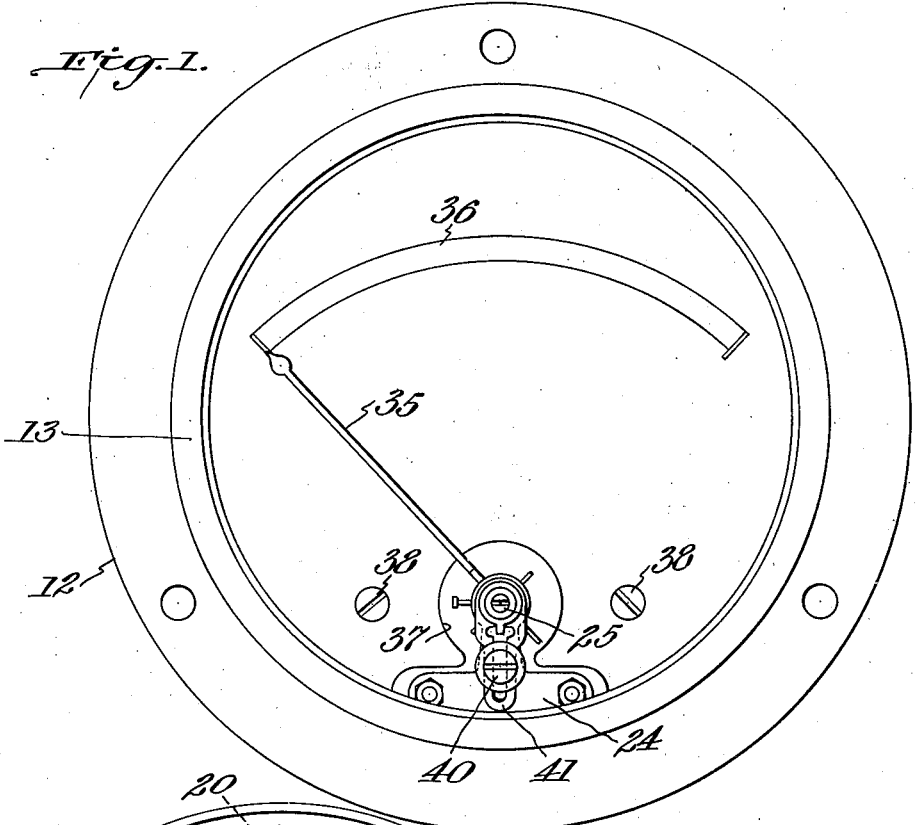
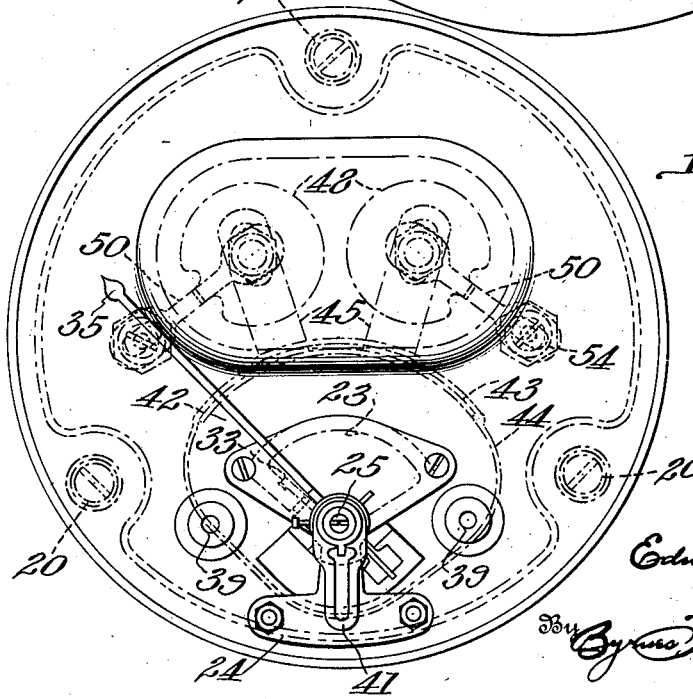
Inventor:
Edward F. Weston,
By Byrnes Townsend & Brickenstein,
Attorneys May 21, 1929.  E. F. WESTON  1,714,202
ELECTRICAL INDICATING INSTRUMENT
Filed Sept. 6, 1927   2 Sheets-Sheet 2

Inventor:
Edward F. Weston,
By Byrnes Townsend & Brickenstein,
Attorneys

Patented May 21, 1929.

1,714,202

UNITED STATES PATENT OFFICE.

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

ELECTRICAL INDICATING INSTRUMENT.

Application filed September 6, 1927. Serial No. 217,851.

This invention relates to electrical indicating instruments and more particularly to instruments of the iron vane type.

An object of the invention is to provide an instrument of simple and economical construction which will function with the accuracy of prior instruments of more complex, bulky and expensive type. An object is to provide an instrument in which temperature changes due to current passed through the windings will not cause a deposit of moisture on the glass cover of the instrument. A further object is to provide an instrument in which the moving system is carried by one base member and the winding or windings are carried by a second base member, and more specifically an instrument of the type stated in which the base members form a substantially hermetic enclosure for the winding. A further specific object is to provide small but accurate instruments of the iron vane type, a decrease in size without loss of efficiency in operation being obtained by locating the vane and damper in the same chamber. A further object is to provide a voltmeter of the iron vane type which may be quickly assembled without the use of soldered connections between the spools and coils of the instrument. More specifically, an object of the invention is to provide voltmeters in which the resistance elements are so constructed that they may be readily secured to an instrument base.

These and other objects of the invention will be apparent from the following specification when taken with the accompanying drawings, in which, Fig. 1 is a front elevation of a voltmeter embodying the invention;

Fig. 2 is a front elevation of the voltmeter as viewed with the casing and scale plate removed;

Figure 3:
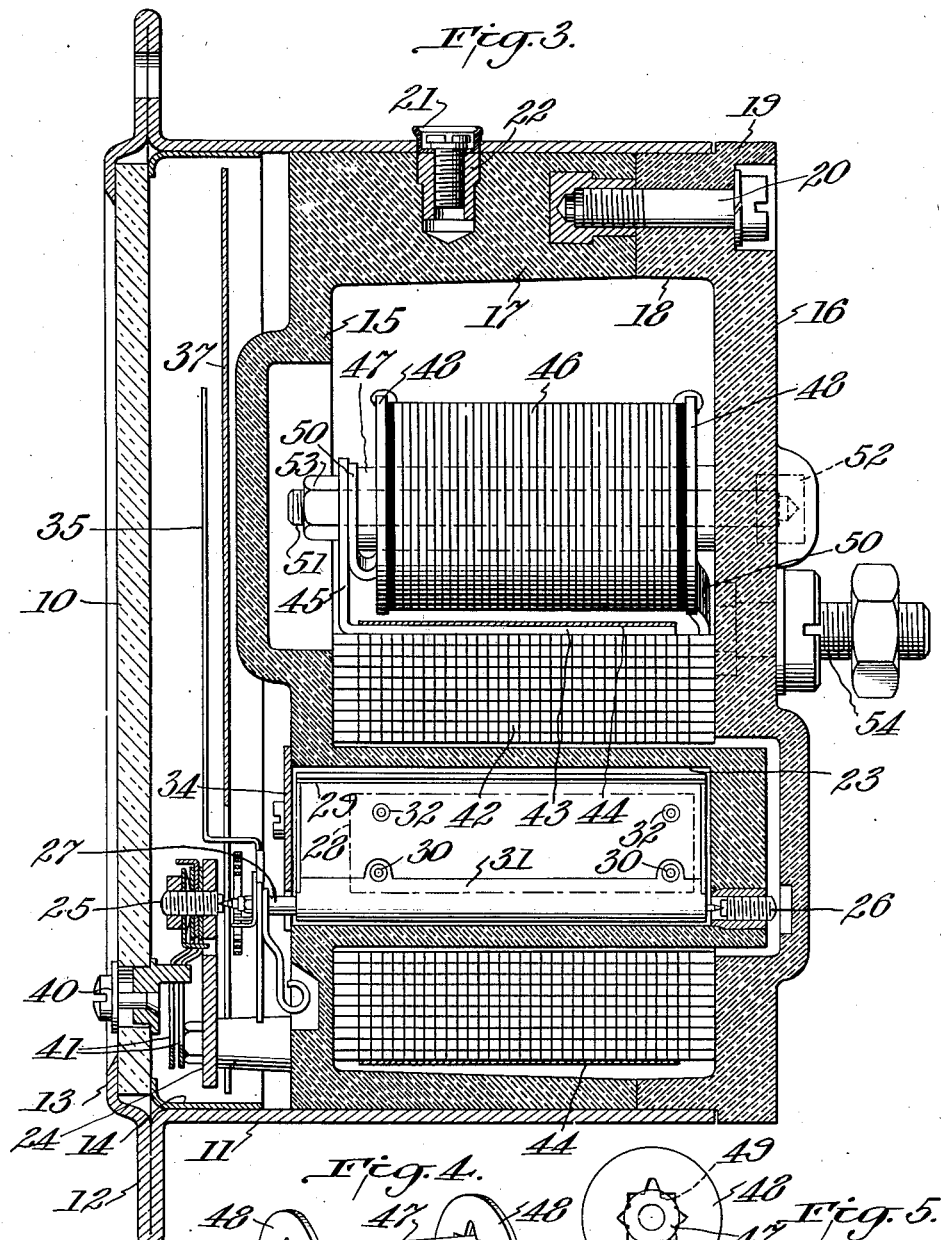
Fig. 3 is a vertical central section through the voltmeter.

In the drawings the numeral 10 indicates the glass cover or front wall of the instrument casing, the side walls 11 preferably taking the form of a sheet metal cylinder which is expanded adjacent the forward end to form the mounting flange 12, and then turned inwardly at 13 for cooperation with ring 14 to retain the glass cover 10.

With the exception of the adjusting screw of the zero corrector, all of the instrument parts form an assembly which may be removed as a unit from the casing. The moving system is carried by a front base member 15 and the winding is supported by the rear base member 16. The terms "front" and "rear" indicate the relative positions of the parts when the instrument is so positioned that Fig. 3 represents a vertical section through the same but it is to be understood that these terms are used in the specification and claims only for convenience of description as the construction may be embodied in instruments in which the axis of the movable system is not arranged horizontally.

The front base member 15 is provided with a peripheral flange 17 which preferably extends into close engagement with the peripheral flange 18 of the rear base member 16. The peripheral surfaces of flanges 17 and 18 are so shaped that they fit snugly within the side wall 11 of the instrument casing, and the edge 19 of rear base member 16 preferably extends over the rear edge of the side walls 11. The two base members are held in assembled position to form a closed housing by means of bolts and threaded inserts 20, and the housing is fixed within the casing by a bolt and flanged washer 21, the bolt passing into the threaded insert 22 of the front base member 15.

The base member 15 is provided with rearwardly offset portions forming the chamber 23 which, as shown in Fig. 2 is of substantially sector shape in cross section. The bridge 24 is carried by the base member 15 and supports a bearing 25 in alignment with the bearing 26 which is mounted in the rear wall of chamber 23, the two bearings being located on the axis of the sector shaped chamber. The shaft 27 which is mounted on the bearings carries the iron vane 28 and also the damper 29, these parts being secured to each other and to the shaft by rivets 30 which pass through the vane and damper, and through an elongated strap 31 which is tightly wrapped about the shaft. Other rivets 32 are passed through the vane and damper near the outer edge of the vane, and the damper is further reinforced by flanging its edges. The fixed iron vane 33 is secured to a radial wall of the chamber 23, and the forward end of the chamber is closed by a plate 34.

The construction permits the use of exceedingly thin sheet aluminum for the damper, and the moving system is therefore of light weight and small size. The invention is distinguished from prior devices in which the iron vane was employed as the damper by the fact that the iron vane may be made of a size and shape determined solely by the electrical requirements of the system.

A pointer 35 is fixed to the shaft 27 and moves over the scale 36 on a scale plate 37 which is secured by screws 38 to bosses 39 on the base member 15. The adjusting element 40 of a zero corrector is mounted in the glass cover 10 and engages within the slotted extensions 41 of the front bearing when the casing is assembled on the housing. The zero corrector and front bearing are preferably of the type described in the patent to Grant Carpenter, No. 1,661,214 issued March 6, 1928, but the specific constructions of these elements do not constitute a part of the present invention.

The instrument windings and coils are rigidly supported by the rear base member 16 and are so shaped and arranged that they will clear the sector shaped chamber 23 of the front base member.

The voltmeter field coil winding 42 is of sector shape in cross section, the opening through the winding being of such size and shape as to clear the chamber 23. The terminals of the winding are connected to a pair of flat metal straps 43 which lie along the upper surface of the winding 42 and are securely attached thereto by a wrapping 44 of paper, fabric or cord. The forward end 45 of each strap 43 projects radially from the winding and is apertured to provide a contact terminal and a mechanical support for the winding.

Figure 4:
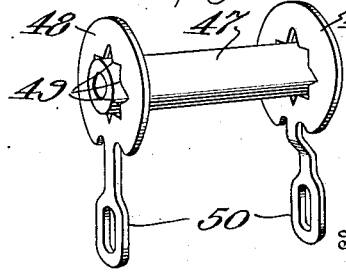
Figs. 4 and 5 are a perspective and an end elevation, respectively, of the spools upon which the resistance coils are wound.
Figure 5:
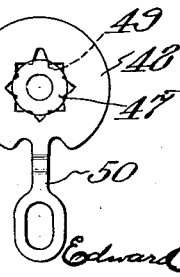

A pair of resistance elements are provided by resistance coils 46 which are wound on spools of the type shown in Figs. 4 and 5. Each spool comprises a tube 47 of insulating material and metal end plates 48 secured to the tube by a plurality of points 49 which are embedded in the material of the tube. Each plate 48 is provided with an apertured extension 50 which serves as one terminal of the resistance element.

As shown in Fig. 3, the resistance elements are mounted upon bolts 51 which are threaded into inserts 52 in the rear base member 16. The ends of resistance coils 46 are connected to the respective end plates 48 of the spools, and the terminal extensions of the forward end plates are bent back to overlie the ends of tubes 47 and to pass over the respective bolts 51. The contact terminals 45 of the voltmeter winding are so spaced that they may be slipped over the bolts 51 and into engagement with the terminal extensions of the respective resistance coils. The electrical connection of the coils and windings, and the mechanical attachment of those parts to the base member 16 is effected by nuts 53 which are turned down upon the forward ends of the bolts 51.

The voltmeter terminals 54 are carried by the base member 16 and the terminal extensions 50 of the rear plates 48 of the resistance elements are secured to the inner ends of the instrument terminals 54.

It will be noted that the only soldering operations in the assembly of the instrument are those required for the connection of the ends of the winding and resistance coils to their several terminals. The assembly of the coils and winding upon the base consumes but little time as the mechanical attachment of the parts to the base member also effects the electrical connection of the circuit elements.

The winding and the resistance coils are completely enclosed by the housing formed by the two base members and the flange 17 of the front base member provides a tight seal between the housing and the space adjacent the glass cover 10. This feature is of considerable practical importance as varying humidity and temperature changes due to the heating effect of current passed through an instrument winding frequently result in a deposition of moisture upon the inner surface of the glass, thus rendering accurate readings difficult or impossible. In the present construction, the contacting surfaces of the flanges 17, 18 and the contacting surfaces of the casing walls 11 and flange 17 are substantially air-tight so far as pressure differences due to the heating effect of the winding is concerned. Under greater differences of pressure such as could be obtained with a vacuum pump or compressor, the joints would doubtless permit leakage, and the term "substantially hermetic seal" is therefore employed in the following claims as indicating a joint which is air-tight under differences of pressure which arise in the usual use of the instruments.

As shown, the base members 15 and 16 are of insulating material, preferably molded into the shapes shown.

Although the invention has been described as embodied in a voltmeter of the iron vane type, it will be understood that the invention is not limited thereto. For example, my copending application, Serial No. 220,031, filed September 16, 1927, describes and claims an ammeter which employs the same general structural features as the voltmeter, but differs therefrom as to the windings which are carried by the rear base member.

It will be understood that the present invention is not limited to electrical instruments of the exact construction shown in the drawings as various changes may be made in the various parts, their number, size, shape and location, without departing from the spirit of my invention as set forth in the following claims.

What I claim is:

1. In a voltmeter, a base member, a pair of rods projecting from said base member, a resistance coil on each of said rods, a winding having contact elements projecting therefrom and secured to the respective rods, said contact elements providing means for supporting said winding from said base member, and means electrically connecting said winding to the said resistance coils.

2. The invention as set forth in claim 1, wherein said means comprises terminal plates for the respective coils, said plates having portions thereof positioned over said rods and in engagement with the respective contact elements of said winding.

3. In a voltmeter, a base member, a spool comprising a tube of insulating material, a pair of metal plates having portions thereof projecting into said tube and having apertured extensions, a resistance coil on said spool and having the ends thereof connected to the respective plates, a moving system and a winding associated therewith, a contact element for said winding, said contact element and the apertured extension of the forward plate of said spool overlying the forward end of the spool, and a bolt passing through said spool to secure the same to said base member and to clamp said contact element to the said forward apertured extension of the resistance spool.

4. In a voltmeter of the iron vane type, a front base member having a portion thereof offset rearwardly to provide a chamber of sector shape in cross section, a vane in said chamber and pivoted along the axis thereof, a rear base member, a resistance coil and a winding carried by said rear base member, said winding being of sector shape in cross section and having an opening therethrough of such size that the winding may be slipped over said chamber in assembling the voltmeter.

5. In a voltmeter, a casing having a transparent wall portion, a scale behind said transparent wall, a moving system including a pointer associated with said scale, a winding and a resistance coil, and a housing providing a substantially hermetic enclosure for said winding and coil, said housing comprising a pair of base members having peripheral flanges extending into contact with each other, one of said base members carrying said scale and moving system, and the other base member carrying said winding and coil.

6. In a voltmeter, base members providing a housing, walls projecting rearwardly into said housing and defining a chamber, a moving system pivoted in said chamber and including a pointer, a casing having a transparent wall permitting observation of said pointer, and a resistance coil and winding in said housing, said chamber and said winding being carried by different base members and said winding having an opening therethrough to clear said chamber in the assembling of said voltmeter.

7. In a voltmeter, a base member, terminal posts carried thereby, a winding and a resistance element, said resistance element comprising a tube of insulating material, plates secured to said tube, a resistance coil between said plates and having its ends connected to the respective plates, and extensions on said plates providing terminals for connecting said resistance coil to said winding and one of said terminal posts.

8. A voltmeter comprising a casing having a rear closure, a resistance element comprising a tube, metal plates on said tube and cooperating therewith to form a spool, and a resistance coil on said spool and having the ends thereof connected to the respective plates; a moving system and a winding associated therewith, terminals carried by said rear closure, and means including extensions on said plates for connecting said resistance coil and said winding between said terminals.

9. In a voltmeter, a base member, a pair of terminals extending through said base member, a winding having a contact terminal projecting radially from the forward end thereof, a resistance element comprising a tube, metal plates on said tube and cooperating therewith to define a spool, a resistance coil on said spool and having the ends thereof connected to the respective plates, the forward plate of said spool having an apertured extension which is bent to overlie the bore of said tube; a bolt carried by said base member and passing through said tube, a nut on said bolt for securing said resistance element to said base and for clamping said contact terminal of said winding to said extension of the forward plate of the resistance element, and means connecting the other ends of said coil and winding to the respective terminals.

10. In a voltmeter, a base member, a pair of rods projecting forwardly from said base member, a resistance element carried by each of said rods, each of said resistance elements comprising a tube positioned on its respective rod, a pair of plates on said tube and cooperating therewith to form a spool, a resistance coil between said plates and having its ends connected to the respective plates, apertured terminal extensions on each of said plates, the terminal extensions of said forward plates being bent to overlie the forward end of the respective tubes; a winding having contact terminals projecting from the forward end thereof and apertured to pass over the respective rods, means on said rods securing said resistance elements to said base member and clamping the respective contact terminals to the terminal extensions associated therewith, and terminal posts on said base member connected to the respective rear terminal extensions of the plates of said resistance elements.

11. In an electrical measuring instrument of the iron vane type, a substantially airtight housing comprising a front and rear base member, a portion of the transverse wall of said front base member being offset rearwardly to provide a chamber of sector shape in cross section, a bridge carried by said front base member and having a pivot arranged on the axis of said chamber, a second pivot mounted on the rear wall of and coaxial with said chamber, a shaft on said pivots, and an iron vane on said shaft, a winding carried by said rear base member, said winding being sector shaped in cross section and having a central passage therethrough of such size as to permit sliding thereof over said chamber in the assembly of said instrument, and a resistance coil supported solely by said rear base member and positioned within said housing.

12. An electrical indicating instrument of the type including a casing having a transparent wall portion, a scale behind said transparent wall, a winding, and a movable system including a pointer associated with said scale, characterized by the fact that a housing within said casing encloses said winding and provides a substantially hermetic seal between said winding and the space adjacent said transparent wall portion, the said housing comprising a pair of base members having peripheral flanges extending into contact with each other, and one of said base members forming the rear closure for said casing.

13. In an electrical indicating instrument, a front base member, an indicating system comprising a movable member, a pointer carried thereby and a scale, said indicating system being mounted upon and supported by said front base member, a rear base member and a winding carried thereby, and means for securing said base members to each other.

14. The invention as set forth in claim 13, in combination with a casing secured to one of said base members and providing an enclosure for said pointer and scale, said rear base member constituting a rear closure for said casing.

15. An electrical indicating instrument as claimed in claim 13 in which the front and rear base members are made of molded insulating material.

16. In an electrical indicating instrument of the iron vane type, a front base member having a chamber extending rearwardly therefrom, said chamber being substantially sector shaped in cross section, a vane pivoted in said chamber along the axis thereof, a rear base member, and a winding of sector shape in cross section carried by said rear base member, said winding being adapted to slip over the said chamber when the two base members are connected to each other.

17. In an electrical indicating instrument of the iron vane type, a casing having a transparent front wall and side walls extending rearwardly therefrom, a base member having a transverse wall portion and a rearwardly directed flange which extends along said side walls of said casing, a chamber extending rearwardly from said transverse wall portion and of substantially sector shape in cross section, a vane pivoted in said chamber along the axis thereof, a pointer carried by said vane, a scale mounted on said base member behind said pointer, and a winding of sector shape in cross section positioned about said chamber, the flange of said base member having a snug fit with the side walls of said casing to provide a substantially hermetic seal between said winding and the space between said transparent front wall of said casing and the transverse wall of said base members.

18. In an electrical indicating instrument of the iron vane type, a base member providing a chamber of substantially sector shape in cross section, a fixed iron vane supported by the walls defining said chamber, a shaft pivoted in said chamber along the axis thereof, a damper carried by said shaft and having its outer edges flanged to reinforce the same, and an iron vane secured to said damper.

19. In an electrical indicating instrument of the iron vane type, a base member providing a chamber of substantially sector shape in cross section, a fixed iron vane supported by the walls defining said chamber, a shaft pivoted in said chamber along the axis thereof, a damper within said chamber, an iron vane of less size than said damper and overlying the same, means securing the outer edge of said vane to said damper, and means securing the inner edges of said vane and damper to each other and to said shaft.

20. In an electrical indicating instrument of the iron vane type, a front and a rear base member having flanges extending into contact with each other to provide a housing, said front base member having portions thereof which are offset rearwardly to define a chamber of sector shape in cross section, an iron vane carried by said front base member within said chamber and pivoted along the axis thereof, a fixed iron vane carried by the walls of said chamber, a winding within said housing and positioned about said chamber, and means for supporting said winding from said rear base member.

21. The invention as set forth in claim 20, in combination with a plate carried by said front base member and substantially closing the forward end of said chamber, and a damper in said chamber and attached to said iron vane.

22. In an electrical measuring instrument of the iron vane type, a substantially air tight housing comprising a front and rear base member, a portion of the transverse wall of said front base member being offset rearwardly to provide a chamber of sector shape in cross section, a bridge carried by said front base member and having a pivot arranged on the axis of said chamber, a second pivot mounted on the rear wall of and coaxial with said chamber, a shaft on said pivots, an iron vane on said shaft, and a winding carried by said rear base member, said winding being sector shaped in cross section and having a central passage therethrough of such size as to permit sliding thereof over said chamber in the assembly of said instrument.

23. In an electrical indicating instrument, a substantially air-tight housing comprising insulating front and rear members, a field coil mounted within said housing and an indicating system outside of said housing and carried by the front member.

In testimony whereof, I affix my signature.

EDWARD F. WESTON.